United States Patent [19]
Thiel

[11] Patent Number: 5,098,239
[45] Date of Patent: Mar. 24, 1992

[54] COVER CAP FOR A HEXAGONAL RECESS

[76] Inventor: Horst Thiel, Lösenbacher Landstrasse 168, D-5880 Lüdenscheid, Fed. Rep. of Germany

[21] Appl. No.: 724,861

[22] Filed: Jul. 2, 1991

[30] Foreign Application Priority Data

Sep. 22, 1990 [DE] Fed. Rep. of Germany ....... 4030090

[51] Int. Cl.$^5$ ............................................. F16B 19/00
[52] U.S. Cl. ...................................... 411/377; 411/431
[58] Field of Search ............... 411/371, 372, 373, 396, 411/377, 431, 429, 430, 910

[56] References Cited

U.S. PATENT DOCUMENTS 2,551,834  5/1951  Ferguson .................... 411/431 X

FOREIGN PATENT DOCUMENTS

| 2461138 | 1/1981 | Fed. Rep. of Germany | 411/373 |
| 678839 | 9/1952 | United Kingdom | 411/377 |
| 916161 | 1/1963 | United Kingdom | 411/373 |
| 920221 | 3/1963 | United Kingdom | 411/377 |
| 925314 | 5/1963 | United Kingdom | 411/373 |
| 2203510 | 10/1988 | United Kingdom | 411/429 |

*Primary Examiner*—Rodney M. Lindsey
*Attorney, Agent, or Firm*—Edwin D. Schindler

[57] ABSTRACT

A cover cap for a hexagonal recess in a screw head with an annular wall engaging in the recess. On the outer side an axial rib is provided, with the diametrical clearance between the outer edge of this rib and the diametrically opposed convex surface line of the outer side of the annular wall being greater than the flank clearance between opposing flank walls of the hexagonal recess.

6 Claims, 1 Drawing Sheet

COVER CAP FOR A HEXAGONAL RECESS

BACKGROUND OF THE INVENTION

1. FIELD OF THE INVENTION

The invention relates to a cover cap for a hexagonal recess in a screw head with an annular wall engaging in the recess.

2. DESCRIPTION OF THE PRIOR ART

Such a cover cap must fit closely within the hexagonal recess. On the other hand the cover cap must be removable for actuation of the screw. This is difficult or almost impossible with cover caps of the prior art.

SUMMARY OF THE INVENTION

The object of the invention is the provision of a cover cap that can be easily inserted and removed and which nevertheless fits firmly within the hexagonal recess.

According to the invention this object is solved in that an axial rib is provided on the external side, with the diametrical clearance between the outer edge of this rib and the diametrically opposed convex surface line of the outer side of the annular wall being greater than the flank clearance between opposing flank walls of the hexagonal recess.

The invention differs from the prior art in that the cover cap can be easily inserted into the hexagonal recess on account of its dimensioning. A 60° turn is made within the hexagonal recess. This causes the cover cap to clamp within the hexagonal recess so that a firm fit is guaranteed in the tensioned position. The annular wall is also deformed in the clamping process, so that uniform, secure clamping is guaranteed. The cover cap is removed by turning it 60° into the loosened position, where it can be easily withdrawn.

The cover cap can be inserted effortlessly in that the external diameter of the annular wall is somewhat smaller than the flank clearance of the hexagonal recess.

Optimum clamping is attained in that the diametrical clearance of the stated rib is approximately 5% greater than the flank clearance of the hexagonal recess.

Turning of the cover cap is facilitated in that a slot for a tool with which to turn it is located in the head wall.

Alignment in the loosened position and the tensioned position is facilitated in that two further ribs are located symmetrically to the diameter line passing through the first rib, each of them at an angle distance of 30° at the circumference.

Handling is facilitated in that the diametrical clearance of each of the further ribs from their diametrically opposed convex surface line corresponds to the flank clearance of the hexagonal recess.

The clamped position or tensioned position is fixed in that the diametrical clearance of the further ribs is somewhat smaller than the flank clearance of the hexagonal recess. In the tensioned position, the further ribs lie slack in each case in a corner of the hexagonal recess and form a limit stop on both sides for the tensioned position.

BRIEF DESCRIPTION OF THE DRAWING

One embodiment of the invention will be described in the following with reference to the drawing, wherein.

DESCRIPTION OF THE PREFERRED EMBODIMENT

Figure 1:
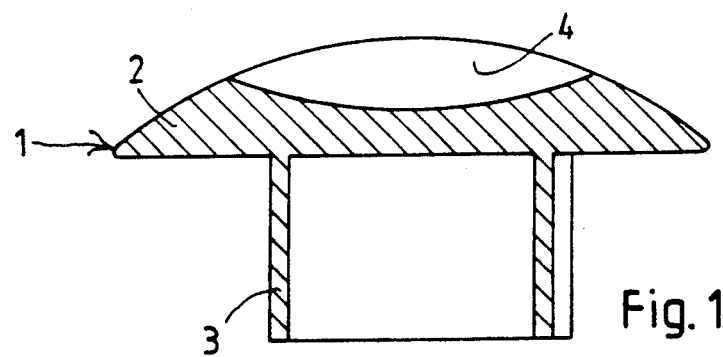
FIG. 1 shows an axial section through a cover cap.

The cover cap 1 comprises a head wall 2 and an annular wall 3. The cover cap 1 consists of elastically flexible thermoplast. A slot 4 for a non-illustrated turning tool is located in the head wall 2. In the simplest case, a token or a coin can be used as a turning tool. The annular wall 3 has on its external side three axial ribs 5 and 6, whose dimensioning is explained in detail below.

The cover cap 1 is designed for closing a hexagonal recess 7 in a screw head. The hexagonal recess has a flank clearance 8 between opposing flank walls.

The external diameter of the annular wall 3 is somewhat smaller than the stated flank clearance 8. The outer edge of the rib 5 has from the opposed convex surface line of the outer edge of the annular wall a diametrical clearance 9 that is greater than the stated flank clearance. The diametrical clearance is approximately 5% greater than the flank clearance.

The two further ribs 6 are located symmetrically to the diameter line 10 passing through the rib 6, each of them at an angle distance of 30° to said diameter line at the circumference. The diametrical clearance 11 of each of these further ribs 6 from the opposed convex surface line corresponds to the flank clearance of the hexagonal recess. This diametrical clearance can be somewhat smaller, preferably up to 5% smaller, than the stated flank clearance.

Figure 2:
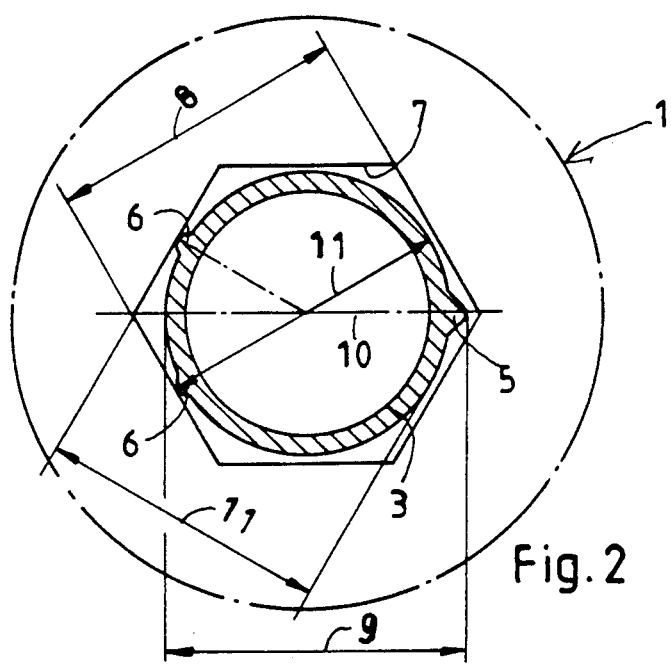
FIG. 2 shows a cross section through the cover cap within a hexagonal recess in loosened position and FIG. 3 shows a corresponding representation for the tensioned position.

Insertion of the cover cap 1 into the hexagonal recess is done in the loosened position according to FIG. 2. The rib 5 is aligned to one corner of the hexagonal recess 7 and can thus be inserted essentially without obstruction. As the diametrical clearance of the further ribs 6 is smaller than the flank clearance of the hexagonal recess, no obstruction occurs there either.

Figure 3:
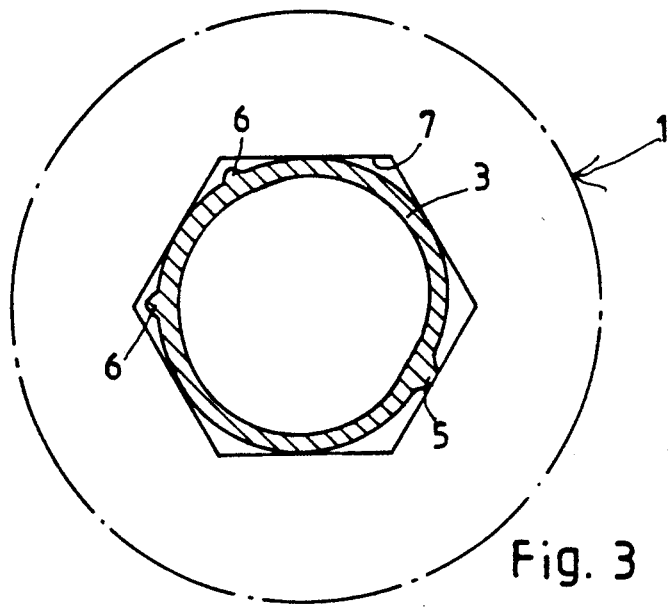

When the cover cap 1 has been inserted, it is turned by an angle of 60°, i.e. by half the pitch angle of the hexagonal recess, into the tensioned position according to FIG. 3. In this process the further ribs 6 drop in each case into a corner of the hexagonal recess 7 and lie there essentially slack. The rib 5 runs along the inner side of the hexagonal recess 7 and leads to a deformation and bracing of the annular wall 3. This results in a high withdrawal resistance for the cover cap. The ribs 6 retain this tensioned position because they run along the inner wall of the hexagonal recess and increase the turning resistance if the cover cap is turned beyond the tensioned position.

The cover cap 1 can be easily withdrawn after being turned to the loosened position, so that the hexagonal recess of the screw head is then accessible and the screw can be actuated.

We claim the following:

1. A cover cap for a hexagonal recess in a screw head, said cover cap comprising:

an annular wall capable of engaging said hexagonal recess, said annular wall having an outer side with an axial rib being provided on said outer side with a diametrical clearance between an outside edge of said axial rib and a diametrically opposed convex surface line of said outer side of said annular wall being greater than the flank clearance between opposed flank walls of said hexagonal recess, said outer side of said annular wall further including two additional ribs being located symmetrically to a diameter line passing through said axial rib with one of said two additional ribs being located on each side of the diameter line at an angular distance of 30° at the circumference relative to the diameter line.

2. The cover cap for a hexagonal recess according to claim 1, said axial rib has a diametrical clearance which is approximately 5% greater than the flank clearance of said hexagonal recess.

3. The cover cap for a hexagonal recess according to claim 1, wherein said two additional ribs have a diametrical clearance from their diametrically opposed convex surface line which corresponds to the flank clearance of said hexagonal recess.

4. The cover cap for a hexagonal recess according to claim 1, wherein said two additional ribs have a diametrical clearance from their diametrically opposed convex surface line which is less than the flank clearance of said hexagonal recess.

5. The cover cap for a hexagonal recess according to claim 1, wherein said annular wall has an external diameter which is smaller than the flank clearance of said hexagonal recess.

6. The cover cap for a hexagonal recess according to claim 1, said cover cap further including a head wall having a slot for a tool for turning said cover cap.

* * * * *